United States Patent
Amornkul

(10) Patent No.: US 11,544,175 B2
(45) Date of Patent: Jan. 3, 2023

(54) SYSTEMS AND METHODS FOR CONTINUITY OF DATAFLOW OPERATIONS

(71) Applicant: Warawut Amornkul, Herndon, VA (US)

(72) Inventor: Warawut Amornkul, Herndon, VA (US)

(73) Assignee: ZERION SOFTWARE, INC, Herndon, VA (US)

( * ) Notice: Subject to any disclaimer, the term of this patent is extended or adjusted under 35 U.S.C. 154(b) by 476 days.

(21) Appl. No.: 15/236,952

(22) Filed: Aug. 15, 2016

(65) Prior Publication Data
US 2018/0046568 A1 Feb. 15, 2018

(51) Int. Cl.
*G06F 11/36* (2006.01)
*G06F 9/445* (2018.01)
*G06F 8/35* (2018.01)
*G06Q 10/06* (2012.01)
*G06F 8/34* (2018.01)

(52) U.S. Cl.
CPC ......... *G06F 11/3668* (2013.01); *G06F 8/35* (2013.01); *G06F 9/44505* (2013.01); *G06Q 10/06* (2013.01); *G06F 8/34* (2013.01)

(58) Field of Classification Search
CPC .......... G06F 8/35; G06F 8/75; G06F 11/3668; G06F 9/44505; G06Q 10/06
See application file for complete search history.

(56) References Cited

U.S. PATENT DOCUMENTS

| | | | | |
|---|---|---|---|---|
| 5,530,802 A * | 6/1996 | Fuchs | ................. | G06F 11/1438 714/17 |
| 5,850,507 A * | 12/1998 | Ngai | ................... | G06F 11/1474 714/16 |
| 6,996,817 B2 * | 2/2006 | Birum | ....................... | G06F 8/65 707/999.202 |
| 7,788,302 B1 * | 8/2010 | Thakur | ................. | G06F 3/0605 707/827 |
| 8,121,966 B2 * | 2/2012 | Routray | ................... | G06N 5/04 706/46 |
| 9,430,337 B1 * | 8/2016 | Gupta | .................... | G06F 11/008 |
| 11,036,677 B1 * | 6/2021 | Grunwald | ............. | G06F 16/183 |
| 2001/0032029 A1 * | 10/2001 | Kauffman | ........ | G06Q 10/06316 700/99 |
| 2009/0171730 A1 * | 7/2009 | Bobak | .................... | G06Q 10/00 705/80 |

(Continued)

*Primary Examiner* — Wei Y Zhen
*Assistant Examiner* — Brahim Bourzik

(57) ABSTRACT

A SaaS system and methods for capturing dataflow integration and optimizing continuity of operation are presented. Consistent with some embodiments, the method may include receiving a dataflow, and calculating a plurality of attribute scores for the dataflow. The method may further include causing a client device to automatically store a dataflow from the dataflow in response to determining that at least a portion of the plurality of attribute scores are above a predefined threshold. The method may further include receiving a dataflow from a recording application associated with a client device and providing to the user of the client device dataflow-recording directions which are adapted to predetermined criteria that correspond to the purpose of dataflow-recording, the type of activity to be presented in said dataflow.

20 Claims, 7 Drawing Sheets

(56) References Cited

U.S. PATENT DOCUMENTS

| | | | | |
|---|---|---|---|---|
| 2009/0210462 A1* | 8/2009 | Arakawa | ............ | G06F 11/1458 |
| 2010/0293532 A1* | 11/2010 | Andrade | ............ | G06F 11/1438 |
| | | | | 717/140 |
| 2011/0083046 A1* | 4/2011 | Andrade | ............ | G06F 11/0793 |
| | | | | 714/47.1 |
| 2011/0138391 A1* | 6/2011 | Cho | ................ | G06F 9/4881 |
| | | | | 718/102 |
| 2011/0161555 A1* | 6/2011 | Olds | .............. | G06F 12/0866 |
| | | | | 711/103 |
| 2013/0094105 A1* | 4/2013 | Nylander-Hill | ........ | G11B 20/18 |
| | | | | 360/53 |
| 2014/0100913 A1* | 4/2014 | Backer | ................ | G06Q 10/06 |
| | | | | 705/7.28 |
| 2014/0304549 A1* | 10/2014 | Hsu | ................ | G06F 11/0793 |
| | | | | 714/15 |
| 2014/0372378 A1* | 12/2014 | Long | .............. | G06F 11/1451 |
| | | | | 707/646 |
| 2015/0242263 A1* | 8/2015 | Klose | .............. | G06F 11/0784 |
| | | | | 714/47.3 |
| 2016/0077926 A1* | 3/2016 | Mutalik | ............ | G06F 16/1844 |
| | | | | 711/162 |
| 2016/0371617 A1* | 12/2016 | Mullaney | ........... | G06Q 10/0635 |
| 2021/0349785 A1* | 11/2021 | Klus | ................ | G06F 11/3423 |

\* cited by examiner

SYSTEMS AND METHODS FOR CONTINUITY OF DATAFLOW OPERATIONS

FIELD OF THE INVENTION

The subject matter disclosed herein generally relates to SaaS dataflow integration. Specifically, the present disclosure relates to optimizing continuity of operations.

BACKGROUND OF THE INVENTION

SaaS Web APIs are driving a new wave of workflow automation tools which up until now have only been taken up by a small handful of the potential customer market. Businesses and enterprise are starting to create workflow automation tooling by daisy-chaining SaaS APIs into a complete business process. According to surveys, nearly 70% of integration tasks will take place outside of an IT department in what is called a bottom-up evangelism. In a changing role, IT is becoming a provider of tooling and templates that help the business units to consume core data objects and resources with SaaS software, which allows relying less on their IT, and being able to act more agilely to provide services and new products that meet potential customer's changing digital media consumption patterns.

Allowing non-IT, non-coders to manipulate and experiment with the data in new ways brings new challenges. Complex business logic now reside in individual dataflows interconnected via SaaS APIs, where data from one dataflow may need to be validated, cleaned, filtered or re-calculated, and then injected into a second dataflow representing either a next stage of a business process, an external service in the cloud, or perhaps even entire ecosystems of apps for the digital business. Non-coders will be developing dataflows that require integrity, security, and being organized appropriately, and will be developing quickly without the tech getting in the way. In contrast to monolithic software developed in traditional life cycle with tightly integrated configuration management, SaaS dataflows are expected to be built by non-coders who may or may not be fluent in formal software configuration training. Nevertheless, should certain events occur that jeopardize the information systems comprise of these dataflows to accomplish its assigned mission, protect its assets, fulfill its legal responsibilities, and maintain its day-to-day functions, an organization that needs the information systems would be at risk from the potential impact. There is a need for do-it-yourself automation SaaS dataflow system that enables building dataflows faster, without developer help, where dataflows receive robust disruption protection with no code required.

SUMMARY OF THE INVENTION

A SaaS system and methods for capturing dataflow integration and optimizing continuity of operations. A dataflow is developed and received from a recording application associated with a client device. The SaaS system comprises an analysis module configured to receive the dataflow. The analysis module is further configured to calculate a plurality of attribute scores for the dataflow. A processor of a machine determines that at least a portion of the attribute scores are above a predefined threshold. An optimization module is configured to determine that a particular combination of the plurality of attribute scores is above a predefined threshold. In response to determining that at least the portion of the attribute scores are above the predefined threshold, the client device automatically stores a particular continuity posture included in the dataflow in a persistent format in a machine-readable medium of the client device. An overall probability score may be calculated for the particular continuity posture using the attribute scores. The overall probability score provides an overall measure of quality of the particular continuity posture.

The optimization module is further configured to cause a particular continuity posture included in the dataflow to be stored in a persistent format in a machine-readable medium in response to determining that the particular combination of the attribute scores is above a predefined threshold. The configuration may be stored in the machine-readable medium without intervention from a user. The client device may also be adapted to display an alert in response to determining that at least the portion of the plurality of attribute scores are above the predefined threshold, the alert notifying a user that the dataflow includes a continuity posture of optimal quality.

The analysis module may be configured to calculate an overall probability score for the particular continuity posture, the overall probability score providing a measure of overall quality of the particular continuity posture.

It may be determined that at least one of the plurality of attribute scores is below a predefined threshold and in response to determining that the at least one of the plurality of attribute scores is below the predefined threshold, textual feedback including a suggestion to improve the at least one attribute score is generated and the textual feedback is displayed on the client device.

A model is a trained classifier that can recognize what's inside a continuity posture according to what it is trained to 'know'. Running a continuity posture through different models can produce different results. A basic model analyzes a continuity posture and returns probability scores on the likelihood that the dataflow is not protected from disruption. The response for model returns probabilities that sum to 100%. Generally, if the probability is less than 15%, it is most likely safe for mission critical dataflows. If the probability is greater than 85%, it is most likely not safe for mission critical dataflows. A basic model can be used to correlate probability scores of a continuity posture to the overall Recovery Time Objective (RTO) and Recovery Point Objective (RPO) of the same continuity posture, such that the aggregated RTO and RPO can in turn be determined for the dataflow in order to characterize the impact on the mission/business process(es) the dataflow supports via daisy-chaining interconnections. Additional custom models may also be developed by users.

An item identifier that identifies an item included in the dataflow may be received and recording directions corresponding to the item identifier may be accessed, where the recording directions, which are presented on the client device, relate to a manner in which the item is to be configured in the dataflow. The recording directions may include analytic data regarding dataflow depicting similar items. A continuity posture is a predefined point in time for disruption recoveries. A disruption may be caused by a unplanned disaster recovery or a planned rollback of a release. Further, a disruption may also be sunset of a dataflow. Each continuity posture optionally includes configurations, aggregate data, and executable code. Configurations may optionally include passwords and sensitive information. Aggregate data may optionally include privacy information. The SaaS system provides automatic storage for the continuity postures in encrypted format to restrict access to dataflow owners only. A user has the option to specify disruption recovery preferences in development phase, to be invoked by the SaaS system in operation phase. In one case where a second dataflow is being disrupted due to release management (either rolling forward to a new release, or rolling back to a previous release), a first interconnected dataflow may prefer to continue operate with the second dataflow in its current release, and the SaaS system may create an operational copy of the second dataflow for continuity of operation. Alternatively, the first dataflow may prefer to connect with the second dataflow in its new release upon availability. In both cases, the SaaS system will invoke any applicable compensating actions accordingly. In another case where a second dataflow is being restored, for example perhaps recovering from a service outage, a first interconnected dataflow may either prefer to connect with the second dataflow upon completion of its restoration, or to request from the system a last known operational copy of the second dataflow for maximum continuity of operation. Incidentally, if the first dataflow prefers to connect with the second dataflow after restoration, it may optionally request to rollback to the beginning of a disruption, suspend operation and resume only upon restoration of the second dataflow. Alternatively, it may prefer continue operation by keeping a transaction record for replaying forward upon the restoration of the second dataflow.

User-submitted compensating actions are specified by user to be invoked by the system for recovery from disruptions, and the actions may be applicable to either an individual dataflow or its interconnected items. Compensating actions may be invoked when a dataflow rolls forward to a new release, rollbacks to a previous release, restores from a disruption, or when a dataflow sunsets reaching its end-of-life. Compensating actions may also be invoked to handle disruption caused by an interconnected item's rolling forward, rolling back, restoring from outage, and sunset. Any compensating action will have an influence on a continuity posture's overall RTO and RPO. RTO is defined as the amount of time a dataflow is designed to take to become available again after a disruption. The RTO clock starts at the moment when a recovery action is invoked, and the RTO clock is deemed to stop once the dataflow becomes available after the recovery. RPO represents the point in time, prior to a disruption or system outage, to which data recovery is to be expected. The RPO is a measure of the maximum time period in which data might be lost if there is a disruption. This measure allows interconnected items that are dependent on the dataflow to take steps to cover this maximum period to avoid or mitigate any impact of losing data that is entered in a time period as defined in the RPO.

Cumulative RTO of a dataflow comprises daisy-chained interconnected items may optionally be defined as a function of the sum of all individual RTO, or alternatively be defined as the maximum RTO value among all the items. Cumulative RPO may be a function of the earliest RPO point in time of all among all interconnected items.

The plurality of attribute scores may provide a measure of at least one 1) dataflows supported and how those dataflows will be impacted in the event of a disruption, 2) core infrastructure components needed to maintain minimal functionality, 3) length of time the infrastructure components can be down before supported dataflows are impacted, or 4) tolerance for loss of data.

Calculation of the plurality of attribute scores may be performed continuously until the determining that at least the portion of the plurality of attribute scores is above the predefined threshold.

The system may further comprise an instructional module configured to perform operations, comprising: determining that a particular attribute score of the plurality of attribute scores is below a predefined threshold; in response to determining that the particular attribute score of the plurality of attribute scores is below the other predefined threshold, generating textual feedback including a suggestion to improve the particular attribute score; and causing the textual feedback to be displayed on a client device associated with the recording application.

The system may further comprise: an identification module 300 configured to receive an item identifier, the item identifier identifying an item included in the dataflow; and an instructional module configured to access recording directions corresponding to the item, the instructional module further configured to cause the recording directions to be presented in conjunction with the dataflow, the recording directions relating to a manner in which the item is to be configured in the dataflow. The identification module 300 may be configured to identify a subject of an continuity posture. A subject of a continuity posture refers to a main object or set of objects being connected to in an dataflow integration. The subject may, for example, be a data input source, a report, a cloud web app, an online file sharing service, a third party owned dataflow, or the like. The identification modules 300 may identify the subject of the dataflow using an item identifier received from a user. The item identifier may be selected from a prepopulated list or supplied by the user (e.g., entered by the user as freeform text).

DETAILED DESCRIPTION OF THE INVENTION

Figure 1:
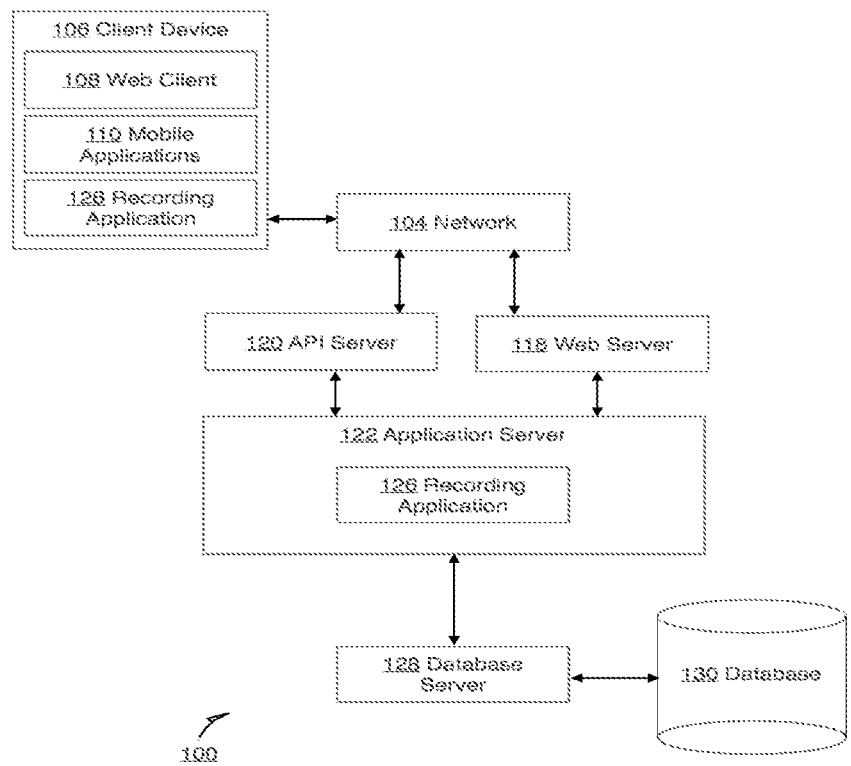
FIG. 1 is a network diagram depicting a network system configured for exchanging data over a network, according to an example embodiment.

FIG. 1 is a network diagram depicting a network system 100, according to one embodiment, having a client-server architecture configured for exchanging data over a network. In various embodiments, the data exchanged within the network system 100 may be dependent upon user-selected functions available through one or more client or user interfaces (UIs). The UIs may be associated with a client device, such as the client device 106 executing a web client 108. The UIs may also be associated with one or more mobile applications 110 executing on the client device 106.

The present disclosure is also directed to a SaaS system that comprises a machine-readable medium, and a recording application.

Figure 2:
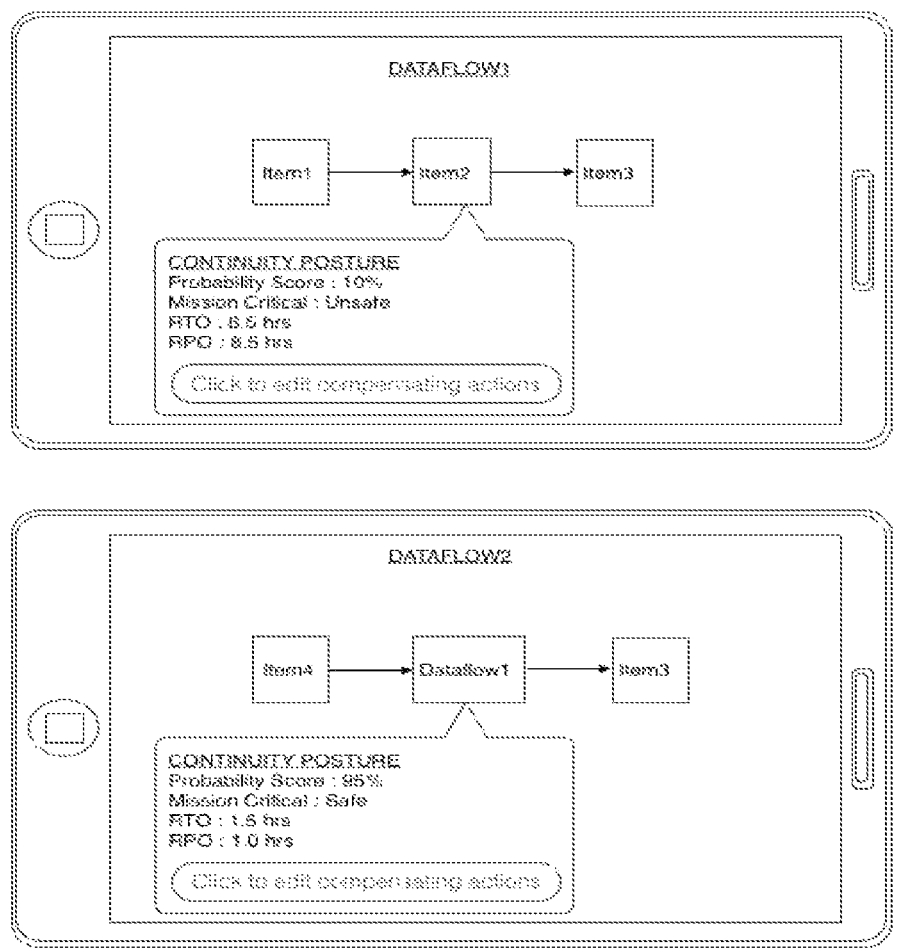
FIG. 2 is an interface diagram illustrating a dataflow being produced on the client device along with feedback related to a continuity posture attribute, according to some embodiments.

FIG. 2 is an interface diagram illustrating the dataflow 200 being produced on the client device 106 along with feedback 210 related to a continuity posture attribute, according to some embodiments. In particular, the feedback 210 suggests that the user operating the client device 106 to improve the continuity posture. The feedback 210 may be provided in response to determining that an attribute score is below a predefined threshold.

Figure 3:
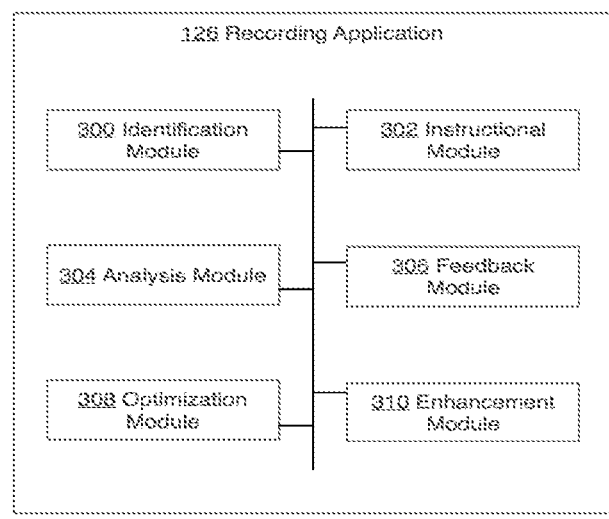
FIG. 3 is a block diagram illustrating an example embodiment of multiple modules forming imaging applications.

FIG. 3 is a block diagram illustrating an example embodiment of multiple modules forming the recording application 126. The recording application 126 is shown as including an identification module 300, an instructional module 302, an analysis module 304, a feedback module 306, an optimization module 308, and an enhancement module 310, all configured to communicate with each other (e.g., via a bus, shared memory, a switch, or application programming interfaces (APIs)). The various modules of the recording application 126 may furthermore access the database 130 via the database servers 128, and may be in communication with one or more of the third party applications 116. Each of the modules of the recording application 126 may further access data stored on the client device 106.

The instructional module 302 may provide users with recording directions related to the configuring continuity posture of a particular subject. The recording directions may be accessed from a repository (e.g., database 130) of recording directions. The recording directions provide users with detailed instructions explaining how a particular subject should be configured in a continuity posture or set of continuity postures. The recording directions may include text, images, audio, video, or combinations thereof. The instructions provided by the instructional modules 302 may be particular to the subject of the continuity posture.

The analysis module 304, including at least one processor, may receive and process a dataflow from a recording application. The dataflow may comprise a series of continuity postures successively recorded by a recording application and may be displayed as a dataflow, for example, on the display of the client device 106. In some embodiments, the processing of the dataflow may include determining scores, respectively, for continuity posture attributes of the dataflow (referred to herein as "attribute scores"). The continuity posture attributes describe various characteristics of a continuity posture included in the dataflow. The continuity posture attributes may, for example, relate to the 1) dataflows supported and how those dataflows will be impacted in the event of a disruption, 2) core infrastructure components needed to maintain minimal functionality, 3) length of time the infrastructure components can be down before supported dataflows are impacted, or 4) tolerance for loss of data. The analysis modules 304 may continuously update and recalculate the attribute scores in real time.

The enhancement module 310 may provide a number of continuity posture enhancement services to users. In some instances, the application of the filters may be such that the overall probability score of the continuity posture is increased. To this end, the particular filters applied to a continuity posture by the enhancement modules 310 may be automatically selected based on the attribute scores of each respective continuity posture, and the application of the filters may be such that the attribute scores corresponding to a particular continuity posture are adjusted by the enhancement modules 310 to optimal levels (e.g., above a certain threshold).

The enhancement modules 310 may detect a subject of a particular continuity posture and may isolate the subject within the continuity posture while removing remaining compensating actions of the continuity posture. The enhancement module 310 may generate a new continuity posture using the isolated subject from the original continuity posture, and replace the original compensating actions. The enhancement modules 310 may allow users to replace the original with a more effectively managed compensating action that is of high availability, and meet continuity of operations and disaster recovery requirements.

Figure 4:
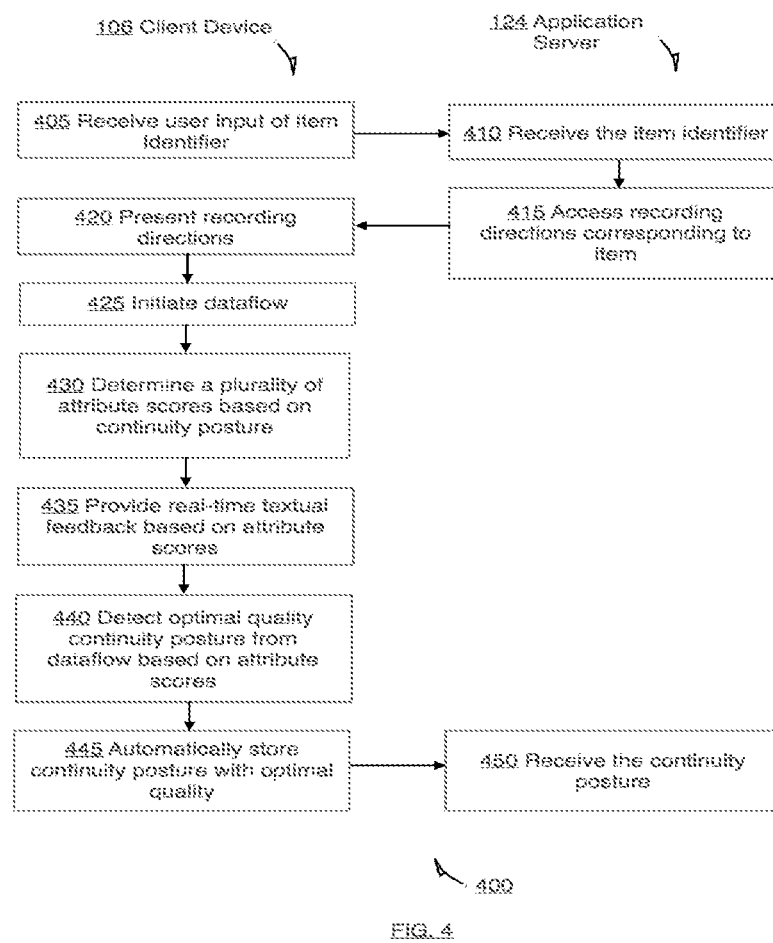
FIG. 4 is an interaction diagram illustrating an example method of capturing an optimal quality continuity posture, according to some embodiments.

FIG. 4 is an interaction diagram illustrating an example method 400 of capturing an optimal quality continuity posture, according to some embodiments. In particular, FIG. 4 illustrates interactions between the client device 106 and the application server 122. In this example embodiment, the client device 106 may include or access at least one identification module 300, analysis module 304, feedback module 306, and optimization module 308, while the application server 122 executes at least one identification module 300 and at least one instructional module 302. However, it shall be appreciated that the inventive subject matter is not limited to this configuration.

At operation 415, the instructional module 302 executing on the application server 122 accesses recording directions (e.g., from the database 130) corresponding to the item identified by the item identifier. The recording directions convey information that may instruct the user how to configure the item identified by the item identifier. The recording directions may be based on the best known methods for configuring certain items or categories of items. The recording directions are transmitted to the client device 106 and presented on a display on the client device 106 to the user at operation 420.

Figure 5:
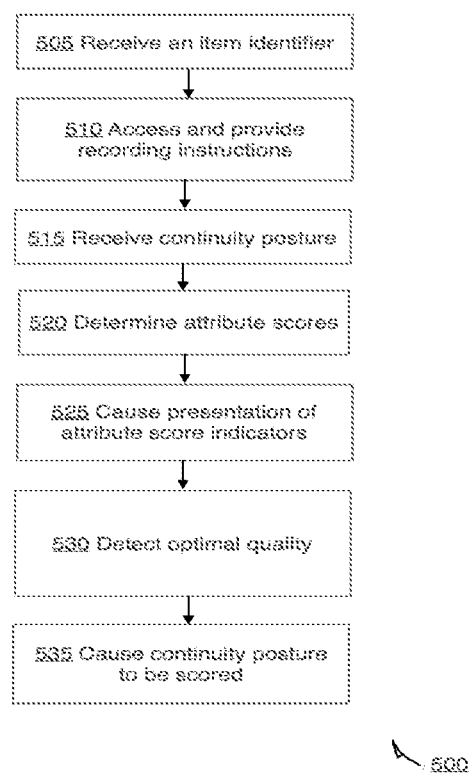
FIG. 5 is a flowchart illustrating an example method of capturing an optimal quality continuity posture, according to some embodiments.

FIG. 5 is a flowchart illustrating a method 500 for optimizing continuity posture quality, according to some embodiments. At operation 505, an item identifier is received (e.g., by the identification module 300). The item identifier may identify an item intended to be included in a continuity posture, set of continuity postures, or dataflow captured using a recording application associated with the client device 106. The identification module 300 may be configured to identify a subject of an continuity posture. A subject of a continuity posture refers to a main object or set of objects being connected to in an dataflow integration. The subject may, for example, be a data input source, a report, a cloud web app, an online file sharing service, a third party owned dataflow, or the like. The identification modules 300 may identify the subject of the dataflow using an item identifier received from a user. The item identifier may be selected from a prepopulated list or supplied by the user (e.g., entered by the user as freeform text).

At operation 510, the instructional module 302 accesses recording directions (e.g., stored in the database 130) and provides the recording directions to the client device 106 for presentation to a user. The directions may provide the user with instructions related to dataflows supported and how those dataflows will be impacted, 2) core infrastructure components needed to maintain minimal functionality, 3) length of time the infrastructure components can be down before supported dataflows are impacted, or 4) tolerance for loss of data. The recording directions may include specific instructions for configuring the particular item identified by the item identifier, or a category of items to which the item belongs.

At operation 530, the optimization module 308 may detect an optimal quality continuity posture being produced in the dataflow based on the attribute scores (e.g., a portion of the attribute scores being above a predefined threshold). The optimization module 308 may select the optimal quality continuity posture, displayed as a configuration of the dataflow, from the dataflow, and at operation 535 may cause the configuration to be stored in a persistent format in a machine-readable medium of the client device 106. The configuration may be stored in the machine-readable medium without intervention from a user.

Figure 6:
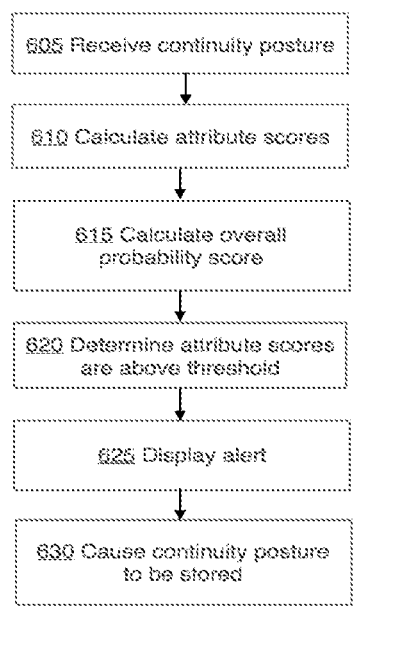
FIG. 6 is a flowchart illustrating a method for capturing an optimal quality continuity posture, according to some embodiments.

FIG. 6 is a flowchart illustrating a method 600 for capturing an optimal quality continuity posture, according to some embodiments. At operation 605, the analysis module 304 receives a dataflow. At operation 610, which is an ongoing operation, the analysis module 304 calculates attribute scores for the dataflow. The analysis modules 304 may continuously update and recalculate the attribute scores in real time as changes occur in the dataflow.

At operation 615, the analysis module 304 calculates an overall probability score for the dataflow using the attribute scores. The overall probability score may provide a measure of the overall quality of dataflow being produced in the dataflow. In some embodiments, the analysis module 304 may calculate the overall probability score by summing the attribute scores, while in other embodiments, the analysis module 304 may calculate the overall probability score by taking a weighted or an unweighted average of the attribute scores. As with the individual attribute scores, the analysis modules 304 may continuously update and recalculate the overall probability score as the individual attribute scores are updated and recalculated.

At operation 620, the optimization module 308 determines that at least a portion of the attribute scores are above a predefined threshold. In some embodiments, the optimization module 308 may determine that a combination of the attribute scores (e.g., a summation of the attribute scores or a weighted or unweighted average attribute score) is above the predefined threshold. In some embodiments, the optimization module 308 may determine that the overall probability score is above a predefined threshold.

At operation 625, the optimization module 308 may cause the client device 106 to display an alert (e.g., a pop-up message) to notify the user that the dataflow includes an optimal quality continuity posture. The optimization module 308 may select the continuity posture occurring in the dataflow at the time the determination of operation 620 is made, and at operation 630, cause the dataflow to be stored (e.g., in the database 130 or a machine-readable medium of the client device 106) in a persistent format. The dataflow may be automatically stored, without any further action taken by the user, in response to the determination that at least a portion of the attribute scores are above the predefined threshold.

Figure 7:
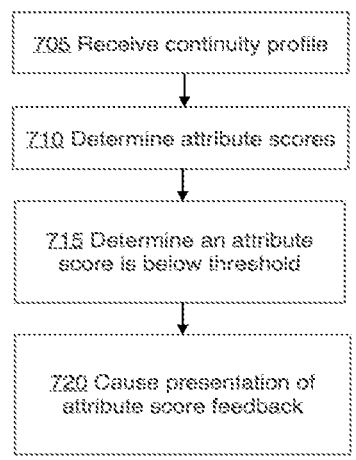
FIG. 7 is a flowchart illustrating a method for providing users with real-time feedback regarding continuity posture quality, according to some embodiments.

FIG. 7 is a flowchart illustrating a method 700 for providing users with real-time textual feedback regarding continuity posture quality, according to some embodiments. At operation 705, the analysis module 304 receives a dataflow. At operation 710, which is an ongoing operation, the analysis module 304 determines attribute scores for the dataflow. At operation 715, the feedback module 306 determines that an attribute score (e.g., determined at operation 710) is below a predefined threshold. Prior to configuring (e.g., selecting and storing) a single continuity posture of the dataflow, the feedback module 306 may provide the user (e.g., cause to be presented on the client device 106) with real-time textual feedback relating to the dataflow at operation 720. The textual feedback provided by the feedback module 306 may indicate that the attribute score is below the predefined threshold, and may include suggestions for improving such attribute scores. In some embodiments, providing textual feedback to the user may include causing the presentation of one or more attribute score indicators in conjunction with the dataflow on the client device 106.

A model is a trained classifier that can recognize what's inside a continuity posture according to what it is trained to 'know'. Running a continuity posture through different models can produce different results. A basic model analyzes a continuity posture and returns probability scores on the likelihood that the dataflow is not protected from disruption. The response for model returns probabilities that sum to 100%. Generally, if the probability is less than 15%, it is most likely safe for mission critical dataflows. If the probability is greater than 85%, it is most likely not safe for mission critical dataflows. A basic model can be used to correlate probability scores of a continuity posture to the overall Recovery Time Objective (RTO) and Recovery Point Objective (RPO) of the same posture, such that the aggregated RTO and RPO can in turn be determined for the dataflow in order to characterize the impact on the mission/business process(es) the dataflow supports via daisy-chaining interconnections. Additional custom models may also be developed by users.

An item identifier that identifies an item included in the dataflow may be received and recording directions corresponding to the item identifier may be accessed, where the recording directions, which are presented on the client device, relate to a manner in which the item is to be configured in the dataflow. The recording directions may include analytic data regarding previous dataflows depicting similar items. A continuity posture is a predefined point in time for disruption recoveries. A disruption may be caused by a unplanned disaster recovery or a planned rollback of a release. Further, a disruption may also be sunset of a dataflow. Each continuity posture optionally includes configurations, aggregate data, and executable code. Configurations may optionally include passwords and sensitive information. Aggregate data may optionally include privacy information. The SaaS system provides automatic storage for the continuity postures in encrypted format to restrict access to dataflow owners only. A user has the option to specify disruption recovery preferences in development phase, to be invoked by the SaaS system in operation phase. In one case where a second dataflow is being disrupted due to release management (either rolling forward to a new release, or rolling back to a previous release), a first interconnected dataflow may prefer to continue operate with the second dataflow in its current release, and the SaaS system may create an operational copy of the second dataflow for continuity of operation. Alternatively, the first dataflow may prefer to connect with the second dataflow in its new release upon being available. In both cases, the SaaS system will invoke any applicable compensating actions accordingly. In another case where a second dataflow is being restored, for example perhaps recovering from a service outage, a first interconnected dataflow may either prefer to connect with the second dataflow upon completion of its restoration, or to request from the system a last known operational copy of the second dataflow for maximum continuity of operation. Incidentally, if the first dataflow prefers to connect with the second dataflow after restoration, it may optionally request to rollback to the beginning of a disruption, suspend operation and resume only upon restoration of the second dataflow. Alternatively, it may prefer continue operation by keeping a transaction record for replaying forward upon the restoration of the second dataflow.

User-submitted compensating actions are specified by user to be invoked by the system for disruption recovery, and the actions may be applicable to either an individual dataflow or its interconnected items. Compensating actions may be invoked when a dataflow rolls forward to a new release, rollbacks to a previous release, restores from a disruption, or when a dataflow sunsets reaching its end-of-life. Compensating actions may also be invoked to handle disruption caused by an interconnected item's rolling forward, rolling back, restoring from outage, and sunset. Any compensating action will have an influence on a continuity posture's overall RTO and RPO. RTO is defined as the amount of time a dataflow is designed to take to become available again after a disruption. The RTO clock starts at the moment when a recovery action is invoked, and the RTO clock is deemed to stop once the dataflow becomes available after the recovery. RPO represents the point in time, prior to a disruption or system outage, to which data recovery is to be expected. The RPO is a measure of the maximum time period in which data might be lost if there is a disruption. This measure allows interconnected items that are dependent on the dataflow to take steps to cover this maximum period to avoid or mitigate any impact of losing data that is entered in a time period as defined in the RPO.

Cumulative RTO of a dataflow comprises daisy-chained interconnected items may optionally be defined as a function of the sum of all individual RTO, or alternatively be defined as the maximum RTO value among all the items. Cumulative RPO may be a function of the earliest RPO point in time of all among all interconnected items.

The invention claimed is:

1. A SaaS system for capturing dataflow integration and optimizing continuity of operations, the system comprising:
   a) a first continuity posture subject having compensations embodied therein for handling disruptions caused by a second continuity posture subject via a daisy-chaining interconnection;
   b) at least one user interface on a client device for storing the first continuity posture subject configured to be executed by the client device having a plurality of recording application executions to implement a SaaS method for capturing dataflow integration and optimizing continuity of operations, wherein the plurality of recording application executions:
   operate the first continuity posture subject with an operational copy of the second continuity posture subject in response to determining a rollback of the second continuity posture subject to a previous release;
   display continuity postures of the first continuity posture subject in the at least one user interface on the client device;
   calculate a plurality of attribute scores for the first continuity posture subject;
   calculate an overall probability score by taking a weighted or an unweighted average of the plurality of attribute scores, correlate the overall probability score to a cumulative Recovery Time Objective (RTO) and a Recovery Point Objective (RPO) of the daisy-chaining interconnection;
   determine that a particular combination of the plurality of attribute scores is above a predefined threshold, store the first continuity posture subject in a persistent format in response to determining that the particular combination of the plurality of attribute scores is above the predefined threshold;
   selectively apply a particular enhancement filter to increase the overall probability score; and
   update the RTO based on how invoking compensations will impact the first continuity posture subject in the event of disruption handling.

2. The system of claim 1, wherein the plurality of recording application executions further comprises:
   determining whether the overall probability score is greater than 85%; and
   recognizing that the first continuity posture subject is unsafe dataflows upon determining that the overall probability score is greater than 85%.

3. The system of claim 1, wherein the plurality of recording application executions further comprises:
   determining whether the overall probability score is less than 15%; and
   recognizing that the first continuity posture subject is safe for dataflows upon determining that the overall probability score is less than 15%.

4. The system of claim 1, wherein the plurality of recording application executions further:
   a) determine that a particular attribute score of the plurality of attribute scores is below the predefined threshold;
   b) in response to determining that the particular attribute score of the plurality of attribute scores is below the predefined threshold, generate textual feedback including a suggestion to improve the particular attribute score; and
   c) display the textual feedback on the client device.

5. The system of claim 1, wherein the plurality of recording application executions further:
   receive an item identifier, the item identifier identifying an item included in the first continuity posture subject;
   access recording directions corresponding to the item, and cause the recording directions to be presented in conjunction with the first continuity posture subject, the recording directions relating to a manner in which the item is to be configured in the first continuity posture subject.

6. A SaaS method for capturing dataflow integration and optimizing continuity of operations comprising:
   a) receiving a first continuity posture subject from a recording application associated with a client device, the first continuity posture subject having compensations embodied therein for handling disruption caused by a second continuity posture subject via a daisy-chaining interconnection;
   operating the first continuity posture subject with an operational copy of the second continuity posture subject in response to determining a rollback of the second continuity posture subject to a previous release;
   displaying continuity postures of the first continuity posture subject in at least one user interface;
   b) calculating a plurality of attribute scores for the first continuity posture subject;
   c) calculating an overall probability score by taking a weighted or an unweighted average of the plurality of attribute scores, and to correlate the overall probability score to a cumulative Recovery Time Objective (RTO) and a Recovery Point Objective (RPO) of the daisy-chaining interconnection;
   d) determining, by a processor of a machine, that at least a portion of the plurality of attribute scores are above a predefined threshold;
   e) in response to determining that at least the portion of the plurality of attribute scores are above the predefined threshold, causing the client device to automatically store the first continuity posture subject in a persistent format in machine-readable medium of the client device;
e1) selectively applying a particular enhancement filter to increase the overall probability score; and
f) updating the RTO based on how invoking the compensations will impact the first continuity posture subject in the event of disruption handling.

7. The method of claim 6, further comprising:
a) determining that at least one attribute score of the plurality of attribute scores is below the predefined threshold;
b) in response to determining that the at least one attribute score of the plurality of attribute scores is below the predefined threshold, generating textual feedback including a suggestion to improve the at least one attribute score of the plurality of attribute scores; and
c) causing the textual feedback to be displayed on the client device.

8. The method of claim 6, further comprising:
a) receiving an item identifier, the item identifier identifying an item included in the first continuity posture subject;
b) accessing recording directions corresponding to the item identifier, the recording directions relating to a manner in which the item is to be configured in the first continuity posture subject; and
c) causing the recording directions to be presented on the client device.

9. The method of claim 6, wherein the plurality of attribute scores provides a measure, the measure comprises at least one of:
a) dataflows supported and how those dataflows will be impacted in the event of a disruption;
b) core infrastructure components needed to maintain minimal functionality;
c) length of time the infrastructure components can be down before supported dataflows are impacted; and
d) tolerance for loss of data.

10. The method of claim 6, wherein the calculating of the plurality of attribute scores is performed continuously until the determining that at least the portion of the plurality of attribute scores is above the predefined threshold.

11. The system of claim 1, wherein the disruption handling further comprising:
determining a planned rollback of the second continuity posture subject to the previous release,
operating the first continuity posture subject with an operational copy of the second continuity posture subject in its current release when the planned rollback is determined, and
operating the first continuity posture subject with the previous release of the second continuity posture subject when the previous release becomes available.

12. The system of claim 1, wherein the disruption handling further comprising:
determining a planned rolling forward of the second continuity posture subject to a new release,
operating the first continuity posture subject with an operational copy of the second continuity posture subject in its current release when the planned rolling forward is determined, and
operating the first continuity posture subject with the new release of the second continuity posture subject when the new release becomes available.

13. The system of claim 1, wherein the disruption handling further comprising:
determining an unplanned service outage of the second continuity posture subject, and
operating the first continuity posture subject with a last known operational copy of the second continuity posture subject when the unplanned service outage is determined.

14. The system of claim 1, wherein the disruption handling further comprising:
determining an unplanned service outage of the second continuity posture subject,
rolling back the first continuity posture subject when the unplanned service outage of the second continuity posture subject is determined, and
resuming operation of the first continuity posture subject upon restoration of the second continuity posture subject.

15. The system of claim 1, wherein the disruption handling further comprising:
determining an unplanned service outage of the second continuity posture subject,
operating the first continuity posture subject by keeping transaction records when the unplanned service outage is determined, and
replaying forward of the transaction records upon restoration of the second continuity posture subject.

16. The method of claim 6, wherein the disruption handling further comprising:
determining a planned rollback of the second continuity posture subject to the previous release,
operating the first continuity posture subject with an operational copy of the second continuity posture subject in its current release when the planned rollback is determined, and
operating the first continuity posture subject with the previous release of the second continuity posture subject when the previous release becomes available.

17. The method of claim 6, wherein the disruption handling further comprising:
determining a planned rolling forward of the second continuity posture subject to a new release,
operating the first continuity posture subject with an operational copy of the second continuity posture subject in its current release when the planned rolling forward is determined, and
operating the first continuity posture subject with the new release of the second continuity posture subject when the new release becomes available.

18. The method of claim 6, wherein the disruption handling further comprising:
determining an unplanned service outage of the second continuity posture subject, and
operating the first continuity posture subject with a last known operational copy of the second continuity posture subject when the unplanned service outage is determined.

19. The method of claim 6, wherein the disruption handling further comprising:
determining an unplanned service outage of the second continuity posture subject,
rolling back the first continuity posture subject when the unplanned service outage of the second continuity posture subject is determined, and
resuming operation of the first continuity posture subject upon restoration of the second continuity posture subject.

20. The method of claim 6, wherein the disruption handling further comprising:

determining an unplanned service outage of the second continuity posture subject, operating the first continuity posture subject by keeping transaction records when the unplanned service outage is determined, and replaying forward of the transaction records upon restoration of the second continuity posture subject.

\* \* \* \* \*